Nov. 17, 1925.
F. C. ALTHEN
1,561,453
MILK BOTTLE CARRIER
Filed July 11, 1923
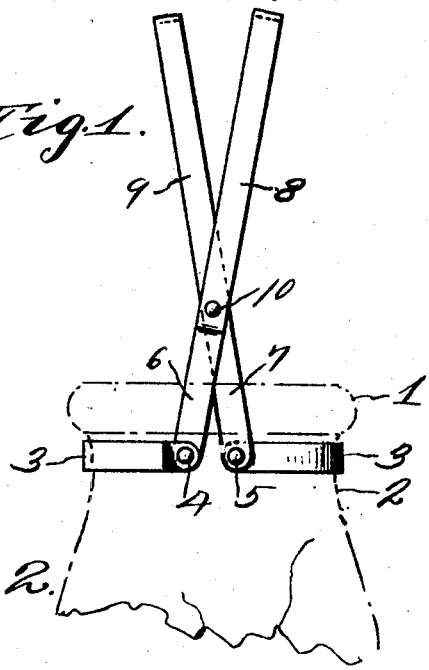
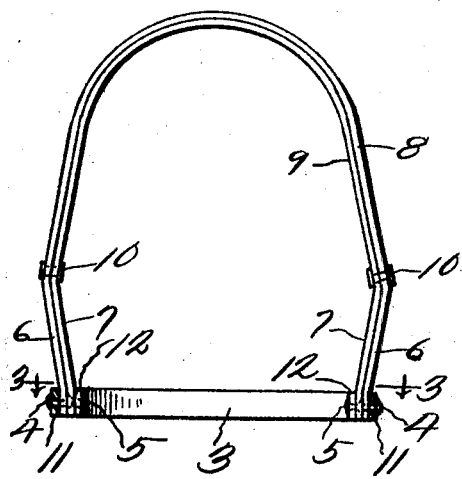
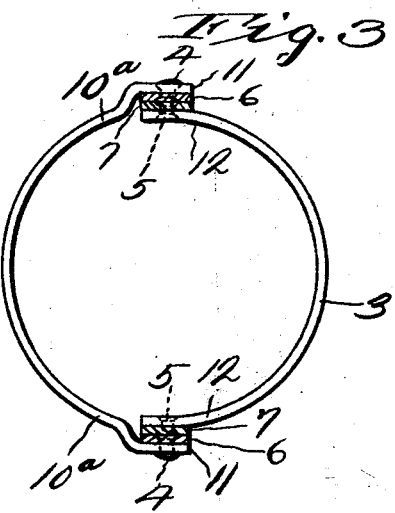
Inventor
F. C. Althen
By D. Swift
Attorney Patented Nov. 17, 1925.

1,561,453

UNITED STATES PATENT OFFICE.

FREDERICK C. ALTHEN, OF ANAMOSA, IOWA.

MILK-BOTTLE CARRIER.

Application filed July 11, 1923. Serial No. 650,909.

*To all whom it may concern:*

Be it known that I, FREDERICK C. ALTHEN, a citizen of the United States, residing at Anamosa, in the county of Jones, State of Iowa, have invented a new and useful Milk-Bottle Carrier; and I do hereby declare the following to be a full, clear, and exact description of the invention, such as will enable others skilled in the art to which it appertains to make and use the same.

The invention relates to milk bottle carriers and has for its object to provide a device of this character whereby bottles, particularly milk bottles having different diameters of necks may be gripped and held by pivoted segmentally shaped members carried by pivoted U-shaped handle members. The weight of the bottle on the segmentally shaped members, force said pivoted segmentally shaped members downwardly at their free ends for additionally gripping the bottle neck.

A further object is to proportion the U-shaped members whereby they can be folded, one within the other and the segmentally shaped bottle neck gripping section moved to position in the same plane as the handle member, thereby allowing the device to be folded into a compact package for storage purposes.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of the device showing the same applied to the neck of a milk bottle.

Figure 2 is a front elevation of the device, showing one of the segmentally shaped members broken away to better show the structure.

Figure 3 is a horizontal sectional view taken on line 3—3 of Figure 2.

Referring to the drawing, the numeral 1 designates a conventional form of milk bottle, and 2 the neck thereof. In milk bottle carriers the devices are constructed in a manner whereby they will not grip the necks of bottles of different diameters, therefore to obviate this difficulty the neck gripping segmentally shaped member 3 are provided, which members have their ends pivotally connected at 4 and 5 to the lower ends of the arms 6 and 7 and pivotally connected U-shaped members 8 and 9 which are pivotally connected at 10. The U-shaped members 8 and 9 are proportioned whereby the U-shaped member 9 may be disposed within the U-shaped member 8, thereby allowing the device, after the segmentally shaped members 3 connected to the arms 6 and 7 thereof are moved to position in the same plane as the U-shaped members to be stored in a minimum amount of space. The segmentally shaped member 3, when folded is disposed between the arms 7 of the U-shaped member 9, and the other segmentally shaped member 3 is moved outwardly to a position in the same plane as the U-shaped member 8. During the carrying of a bottle the segmentally shaped members 3 grip the opposite sides of the neck 2, consequently when the operator grasps the upper ends of the U-shaped members 8 and 9, using the same as a handle the bottle will be securely held, and also bottle necks of different diameters may be received and held within the device.

Where small bottles are being grasped the U-shaped members 8 and 9, after assuming positions in the same plane, it is obvious that the weight of a bottle suspended between the segmentally shaped neck gripping members 3 will pull said members 3 downwardly towards each other, thereby allowing them to assume positions for holding a relatively small bottle neck. The ends $10^a$ of one of the segmentally shaped members 3 are provided with offset portions 11, which are pivotally connected at 4 to the outer sides of the arms 6 of the U-shaped member 8. The ends 12 of the other segmentally shaped member 3 are pivotally connected to the inner sides of the arm 7 of the other U-shaped handle member 9. Therefore it will be seen that the segmentally shaped members 3 are substantially concentric in relation to the center of the bottle 1, and consequently will grip the bottle neck 2 when the device is placed thereon.

The invention having been set forth what is claimed as new and useful is:—

A bottle carrying device comprising oppositely disposed associated U-shaped members circumferentially arranged on substantially the same arc, one of said U-shaped members having its ends provided with compound bends, thereby forming offset ears outside of the ends of the other segmentally shaped member and spaced from said ends, inverted U-shaped handle members, said handle members having their arms crossed and pivoted together, the ends of the arms of the inverted U-shaped handle members being pivotally connected to the offset ears carried by one of the segmentally shaped members and to the inner side of said ears and to the outer side of the ends of the other segmentally shaped members said arms of the U-shaped members diverging angularly upwardly and outwardly from the ends of the segmentally shaped members, said arms of the U-shaped members converging inwardly and upwardly from adjacent their pivotal points.

In testimony whereof I have signed my name to this specification.

FREDERICK C. ALTHEN.